United States Patent [19]
Demillecamps et al.

[11] 3,935,159
[45] Jan. 27, 1976

[54] PLASTICS COMPOSITIONS BASED ON POLYVINYLIDENE FLUORIDE

[75] Inventors: Edmond Demillecamps, Wavre; André Orban, Brussels, both of Belgium

[73] Assignee: Solvay & Cie, Brussels, Belgium

[22] Filed: June 28, 1974

[21] Appl. No.: 484,628

[30] Foreign Application Priority Data
July 10, 1973 France .............................. 73.25685

[52] U.S. Cl. ............ 260/42.27; 252/12; 260/42.17; 260/42.18; 428/421; 428/457; 428/469
[51] Int. Cl.² ........................................... C08K 3/22
[58] Field of Search ................................. 260/42.27

[56] References Cited
UNITED STATES PATENTS
| | | | |
|---|---|---|---|
| 3,340,222 | 9/1967 | Fang ................................ | 260/42.27 |
| 3,498,939 | 3/1970 | Schier et al. ..................... | 260/42.27 |

Primary Examiner—James H. Derrington
Attorney, Agent, or Firm—Spencer & Kaye

[57] ABSTRACT

Plastics compositions based on polyvinylidene fluoride which possess improved impact strength comprising 0.05 to 6 parts by weight of rhombohedral iron sesquioxide per 100 parts of polyvinylidene fluoride.

4 Claims, No Drawings

PLASTICS COMPOSITIONS BASED ON POLYVINYLIDENE FLUORIDE

The present invention relates to plastics compositions based on polyvinylidene fluoride which are suitable for manufacturing shaped articles and coatings which possess improved impact strength.

Polyvinylidene fluoride is a thermoplastic polymer which possesses a combination of noteworthy physical and chemical properties, especially excellent resistance to ageing, to heat and to abrasion and also noteworthy chemical inertness and a high dielectric constant. Polyvinylidene fluoride is suitable for manufacturing articles shaped by any conventional processing techniques such as injection moulding, blow moulding, extrusion moulding and compression moulding. It is also a choice material for powder-coating very diverse surfaces using conventional techniques such as electrostatic spraying and fluidisation.

It is known to add various fillers to thermoplastic polymers and especially to polyvinylidene fluoride for the main purpose of reducing the cost price of the articles or coatings produced. This addition which, as a general rule, is accompanied by an improvement in the rigidity of the said articles or coatings, generally leads to serious disadvantages and especially to a marked decrease in the impact strength.

There has now been found, in accordance with the present invention, plastics compositions based on polyvinylidene fluoride and a metal oxide which make it possible to manufacture moulded components and coatings, the impact strength of which is, very surprisingly, markedly improved.

The invention relates to plastics compositions based on polyvinylidene fluoride which possess improved impact strength, characterised in that they comprise 0.05 to 6% by weight of rhombohedral iron sesquioxide relative to the polyvinylidene fluoride.

The effect of the improvement in the impact strength of the moulded components and coatings manufactured using compositions according to the invention is surprising and specific. In fact, the use of conventional fillers such as, for example, talc leads to a very marked decrease in the impact strength. Neither do pseudocubic iron sesquioxide, commonly called $\gamma$-iron sesquioxide, and ferrites which are mixed compounds of an iron sesquioxide and another metal oxide, show the surprising properties of the compositions of the invention.

Rhombohedral iron sesquioxide, also called $\alpha$-iron oxide, is the final product resulting from complete low temperature oxidation of iron as well as of iron oxides and iron hydrates. Its preparation is described in Volume XVII, first section, pages 636–638 of Nouveau Traite de Chimie Minerale (New Treatise on Inorganic Chemistry) by P. Pascal (published by Masson & Cie, 1967).

The concentration limits of rhombohedral iron sesquioxide in the polyvinylidene fluoride are critical. It is, in fact, necessary to incorporate at least 0.05 part by weight of this oxide into the polyvinylidene fluoride in order to produce a marked improvement in the impact strength of the articles and coatings produced. Moreover, the addition of rhombohedral iron sesquioxide in amounts greater than 6 parts by weight is not desirable since the resulting compositions show less chemical inertness.

The polyvinylidene fluoride used in the present invention is a homopolymer or a copolymer containing more than 90 mol % of vinylidene fluoride. It can be manufactured without differentiation by any conventional processes for the polymerisation of vinylidene fluoride. A polyvinylidene fluoride manufactured by suspension polymerisation is preferably used, which possesses an intrinsic viscosity of 0.4 to 1.5 dl/g, and preferably 0.7 to 1.2 dl/g, measured at 110°C in dimethylformamide.

The particle size of the polyvinylidene fluoride is not in any way critical. Where appropriate, it will be suited to the method of processing considered, by means of grinding and/or granulation techniques well known to those skilled in the art.

The incorporation of rhombohedral iron sesquioxide into polyvinylidene fluoride does not pose any special problem; these materials are perfectly compatible within the range of concentrations claimed and can be mixed by simple mechanical mixing. If it is necessary to change the particle size of the polyvinylidene fluoride, the rhombohedral iron sesquioxide will advantageously be incorporated at the same time as the polyvinylidene fluoride is being ground and/or granulated.

The compositions according to the invention can contain the usual additives for processing thermoplastic polymers, such as lubricants, plasticisers, stabilisers or fillers and more particularly fibrous fillers such as fibres of glass, asbestos, graphite, boron and silicon.

The improved compositions according to the invention possess numerous possibilities for use. In particular, the use of the compositions according to the invention for manufacturing moulded components and coatings is a further subject of the present invention.

The use of compositions containing 0.05 to 1% by weight, and preferably 0.05 to 0.6% by weight, of rhombohedral iron sesquioxide relative to polyvinylidene fluoride makes it possible to manufacture shaped articles which possess not only improved impact strength but also greater flexibility than that of articles manufactured using virgin polyvinylidene fluoride. This improved flexibility enables the compositions according to the invention containing 0.05 to 1% by weight or rhombohedral iron sesquioxide relative to polyvinylidene fluoride to be used in fields wherein thermoplastic polymers which are more flexible than polyvinylidene fluoride are usually employed, and especially in cable-making.

The use of compositions containing 0.3 to 6% by weight, and preferably 0.5 to 3% by weight, of rhombohedral iron sesquioxide relative to polyvinylidene fluoride makes it possible to manufacture coatings on metal surfaces which possess simultaneously improved impact strength and improved adhesion.

Finally, the compositions according to the invention containing 1 to 6% by weight, and preferably of the order of 5% by weight, of rhombohedral iron sesquioxide relative to polyvinylidene fluoride are suitable for manufacturing rigid shaped articles possessing good impact strength, by any conventional processing techniques, and in particular by injection moulding. These compositions are suitable, for example, for producing valves, pumps, cogwheels, cams, bearings, sockets, casings and the like.

The examples which follow illustrate the invention without, however, limiting it.

Example 1, a reference example, relates to a sample of virgin polyvinylidene fluoride which possesses an intrinsic viscosity of 1 dl/g at 110°C in dimethylformamide.

Examples 2 to 6, the composition of which is given in the attached table I, relate to samples based on polyvinylidene fluoride identical to that of Example 1, containing amounts, increasing from 0.05 to 1% by weight, of rhombohedral iron sesquioxide, sold under the trademark MAPICO RED 516 dark, by the Columbia Carbon Co. division of Messrs. Cities Service.

Table I also gives the impact strength found by dropping weights on discs as well as the apparent torsional rigidity modulus at 20°C of samples 1 to 6.

The impact strength found by dropping weights on discs is measured on a series of 70 injection-moulded discs of 50 mm diameter and 2 mm thickness. These discs are laid on a carrier which supports them only at their circumference. A weight of 1 kg is then allowed to fall on each disc from a varying height and the impact energy at which 50% of the discs break is determined.

The apparent torsional rigidity modulus at 20°C is measured at 35° of arc on injected test pieces in accordance with ASTM Standard Specification D 1043/51.

The impact strength and the apparent rigidity modulus are measured respectively on discs and test pieces which have been aged for 120 hours.

Comparison of the results of examples 2 to 6 with those of the reference example 1 shows adequately that the addition of 0.05 to 1 part by weight of rhombohedral iron oxide to 100 parts of polyvinylidene fluoride substantially improves the impact strength of the latter. It is also apparent that samples 2 to 6 are more flexible than polyvinylidene fluoride which does not contain any rhombohedral iron sesquioxide.

EXAMPLES 7 TO 10

Example 7, a reference example, relates to a sample of polyvinylidene fluoride which possesses an intrinsic viscosity of 0.8 dl/g at 110°C in dimethylformamide.

Examples 8 to 10 relate to samples based on polyvinylidene fluoride identical to that of example 7, containing amounts of rhombohedral iron sesquioxide, identical to that used in examples 2 to 6, which increase from 1.75 to 5.5 parts by weight per 100 parts by weight of polyvinylidene fluoride. The attached table II gives the impact resistance found by dropping weights on discs and the apparent rigidity modulus at 20°C of samples 7 to 10, determined as described above.

Comparison of the results of examples 8 to 10 with those of the reference example 7 shows that the addition of 1.75 to 5.5 parts by weight of rhombohedral iron sesquioxide to polyvinylidene fluoride also substantially improves the impact strength of polyvinylidene fluoride while increasing its rigidity.

EXAMPLES 11 to 15

These examples, which are all reference examples, relate to the incorporation of γ-iron sesquioxide, sold under the trademark MAPICO BROWN 422, into polyvinylidene fluoride which possesses an intrinsic viscosity of 0.8 dl/g at 110°C in dimethylformamide and is identical to that used in examples 7 to 10. The attached table III gives the composition of the samples and the impact strength found by dropping weights on discs measured at −20°C on discs which have been aged for 24 hours.

EXAMPLES 16 to 20

These examples, which are also all reference examples, relate to the incorporation of a ferrite based on iron sesquioxide and zinc oxide, sold under the trademark MAPICO TAN 10, into polyvinylidene fluoride which possesses an intrinsic viscosity of 0.8 dl/g at 110°C in dimethylformamide. The attached table IV gives the composition of the samples according to examples 16 to 20 and the impact strength found by dropping weights on discs, measured at −20°C on discs which have been aged for 24 hours.

The results of the reference examples 11 to 20 show adequately that non-rhombohedral iron oxides do not show the surprising property of improving the impact strength of polyvinylidene fluoride.

EXAMPLES 21 TO 24

These examples relate to the manufacture of coatings on steel plates using virgin polyvinylidene fluoride (example 21, a reference example), and using compositions based on polyvinylidene fluoride which possesses an intrinsic viscosity of 0.8 dl/g and contains amounts of rhombohedral iron sesquioxide, identical to that used in examples 2 to 6, which increase from 0.3 to 3 parts by weight per 100 parts by weight of polyvinylidene fluoride. The composition of the mixtures used in examples 21 to 24 is given in the attached table V.

The coating by electrostatic spraying is carried out on steel plates of 150 × 100 × 1 mm which have undergone, by spraying, degreasing with alkali and rinsing with water at ambient temperature, amorphous iron-manganese phosphatisation, and finally, after a last rinse with water, a rinsing with chromic acid followed by drying with hot air. The plates thus treated are preheated to 250°C and are then coated by spraying under a negative voltage of 70 kV so as to produce a layer of a thickness of 250 microns. The coated plates are then heated at 250°C for 5 minutes before being quenched in water.

The adhesion is measured by a 6 mm stamping effected on the coated plate by means of an Erichsen apparatus, after the plate has been scared with two parallel lines 3mm apart which intersect at right angles with two other identical lines. Using a sharp instrument, an attempt is then made to lift off the various coating zones at the stamping position and a number from 0 to 5 is given depending on whether it is possible to lift off all or none of the stamped zone.

The cut test pieces are also subjected to the salt spray test in accordance with ASTM Standard Specification B 119 and are removed as soon as corrosion begins to extend under the coating.

The adhesion and the resistance to the salt mist of the test pieces according to examples 21 to 24 are given in the attached table V.

Comparison of examples 22 to 24 with the reference example 21 shows that the addition of 0.3 to 3 parts by weight of rhombohedral iron sesquioxide has especially the effect of improving substantially the adhesion and the resistance to corrosion of polyvinylidene fluoride coatings.

All the examples described above prove adequately that the compositions according to the invention all possess a series of great advantages and in particular improved impact strength relative to that of virgin polyvinylidene fluoride.

TABLE I

| No. of the example | $\alpha$-Fe$_2$O$_3$, parts per 100 parts of PVDF (*) | Impact strength on discs at 20°C, kgm | Apparent torsional rigidity modulus, 35° of arc, 20°C kg/cm$^2$ |
|---|---|---|---|
| R 1 | 0 | 0.55 | 5,620 |
| 2 | 0.05 | 0.80 | 5,000 |
| 3 | 0.075 | 0.91 | 4,650 |
| 4 | 0.10 | 1.03 | 4,600 |
| 5 | 0.50 | 1.72 | 4,850 |
| 6 | 1.00 | 1.72 | 4,950 |

(*) polyvinylidene fluoride

TABLE II

| No. Of the example | $\alpha$-Fe$_2$O$_3$, parts per 100 parts of PVDF | Impact strength on discs at 20°C, kgm | Apparent torsional rigidity modulus, 35° of arc, 20°C kg/cm$^2$ |
|---|---|---|---|
| R 7 | 0 | 0.55 | 5,600 |
| 8 | 1.75 | >2 | 5,850 |
| 9 | 3.00 | >2 | 5,950 |
| 10 | 5.50 | >2 | 6,200 |

TABLE III

| No. of the example | $\gamma$-Fe$_2$O$_3$, parts per 100 parts of PVDF | Impact strength on discs at −20°C, kgm |
|---|---|---|
| R 11 | 0 | 0.96 |
| R 12 | 0.10 | 0.44 |
| R 13 | 0.50 | 0.36 |
| R 14 | 1.00 | 0.32 |
| R 15 | 5.00 | 0.05 |

TABLE IV

| No. of the example | Ferrite Fe$_2$O$_3$ and ZnO parts per 100 parts of PVDF | Impact strength on discs at −20°C, kgm |
|---|---|---|
| R 16 | 0 | 0.91 |
| R 17 | 0.10 | 0.93 |
| R 18 | 0.50 | 0.67 |
| R 19 | 1.00 | 0.33 |
| R 20 | 5.00 | 0.06 |

TABLE V

| No. of the example | $\alpha$-Fe$_2$O$_3$, parts per 100 parts of PVDF | Adhesion (Erichsen) | salt mist, hours |
|---|---|---|---|
| R 21 | 0 | 3 | 18 |
| 22 | 0.3 | 3 | 215 |
| 23 | 1.0 | 5 | 333 |
| 24 | 3.0 | 5 | 333 |

1. A plastic composition based on polyvinylidene fluoride which possesses improved impact strength, comprising 0.05 to 6 parts by weight of rhombohedral iron sesquioxide per 100 parts of polyvinylidene fluoride.

2. The composition according to claim 1 which also possesses increased flexibility, comprising 0.05 to 1 part by weight of rhombohedral iron sesquioxide per 100 parts of polyvinylidene fluoride.

3. The compositions according to claim 1 which also possesses increased rigidity, comprising 1 to 6 parts by weight of rhombohedral iron sesquioxide per 100 parts of polyvinylidene fluoride.

4. The composition according to claim 1 which also shows greater adhesion and which can be used for coating metal surfaces, comprising 0.3 to 6 parts by weight of rhombohedral iron sesquioxide per 100 parts of polyvinylidene fluoride.

* * * * *

UNITED STATES PATENT OFFICE
CERTIFICATE OF CORRECTION

PATENT NO. : 3,935,159
DATED : January 27th, 1976
INVENTOR(S) : Edmond Demillecamps et al It is certified that error appears in the above-identified patent and that said Letters Patent are hereby corrected as shown below:

Column 2, line 43, change "or" to --of--.

Column 3, line 8, change "Columbia" to --Columbian--.

Signed and Sealed this

Third Day of August 1976

[SEAL]

Attest:

RUTH C. MASON
*Attesting Officer*

C. MARSHALL DANN
*Commissioner of Patents and Trademarks*